Nov. 27, 1951   W. A. FLUMERFELT   2,576,830
UNIVERSAL JOINT WITH WIDE ANGLE OF OSCILLATION
Filed Aug. 7, 1948
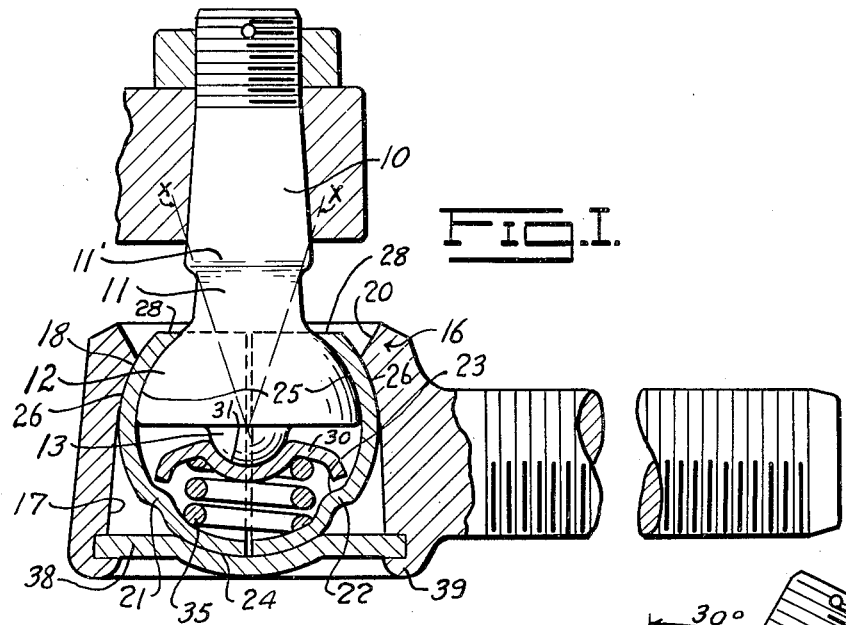
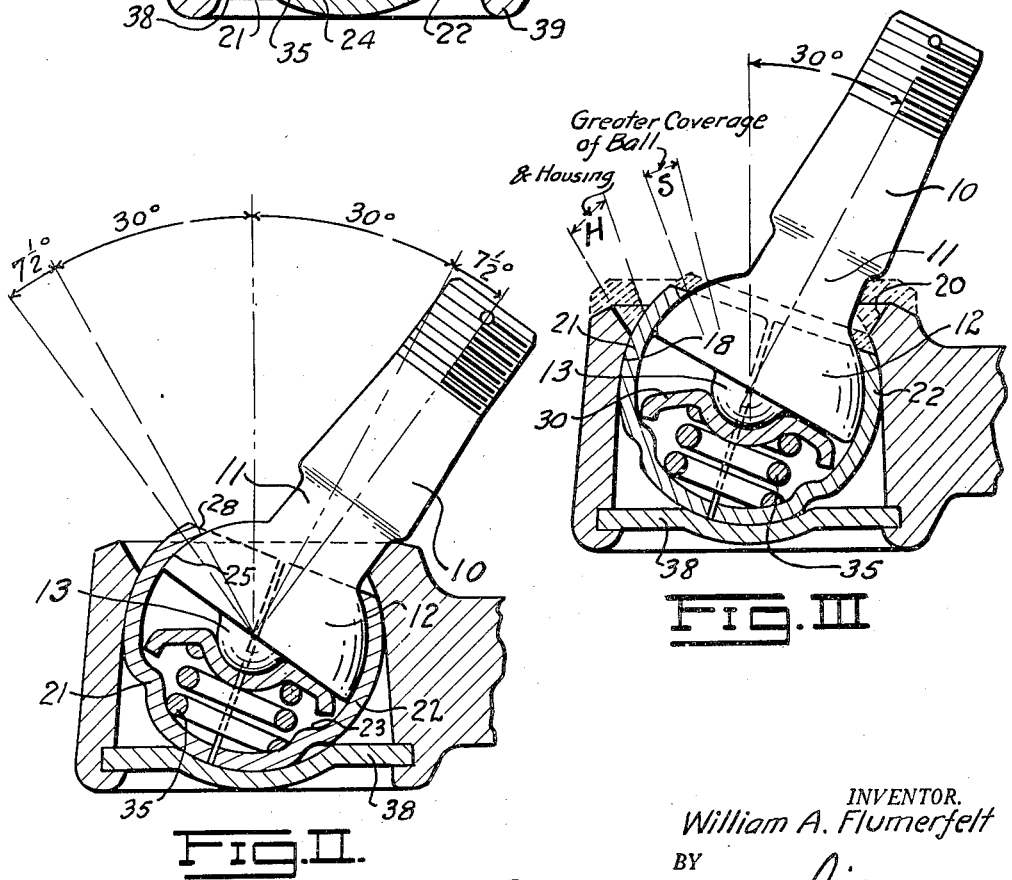
INVENTOR.
William A. Flumerfelt
BY
Edmund B. Whitcomb
ATTORNEY Patented Nov. 27, 1951

2,576,830

UNITED STATES PATENT OFFICE 2,576,830

UNIVERSAL JOINT WITH WIDE ANGLE OF OSCILLATION

William A. Flumerfelt, Columbus, Ohio, assignor to The Columbus Auto Parts Company, Columbus, Ohio, a corporation of Ohio Application August 7, 1948, Serial No. 43,133

3 Claims. (Cl. 287—90)

This invention relates to universal joints and has for its object to provide a novel construction and assembly of ball and ball stud, housing and ball seats and take-up means, the assembly permitting an extremely wide angle of oscillation of the stud relative to the housing, without uncovering too large an area of the ball and ball seats to thereby produce a joint with a high factor of safety against the possibility of the ball joint pulling apart in use.

The present invention is primarily concerned with an improved configuration of ball stud in combination with a special construction of the edges of both the housing and the position and shape of the ball seats relative to said specially constructed ball stud, whereby a substantially wide angle of oscillation is obtained between the housing and the stud. The modification of the neck of the stud is specially designed without weakening the stud strength against bending moment and, moreover, the configuration of the stud maintains the shear and torsion resistance in various positions of adjustment of the ball stud in use. By providing a vertical central pivotal bearing for the ball and also working surfaces between the ball and the ball seats on the one hand and between the ball seats and the housing on the other hand, I provide a ball and socket joint having the extreme angle of oscillation above referred to and, at the same time, extensive area for the working surfaces of the relatively moving parts.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a vertical sectional view of my improved construction, parts being shown in elevation with the axis of the ball stud at right angles to the axis of the tie rod tenon.

Figure II is a similar vertical sectional view with the ball stud moved to the widest angle of its oscillation.

Figure III is a vertical sectional view of a modification in which the housing and ball seats extend a greater distance over the area of the seats and the ball.

Referring to the drawings, Figures I and II, the ball stud 10 has a particularly shaped reduced neck portion 11 of the particular configuration indicated. The ball portion 12 in the present instance is a substantially half ball with a central pivotal bearing extension or pip 13.

The housing 16 has through one end an internal cavity or opening 17 shown in Figure I, the opening merging into a spherical seat bearing or working part 18 toward the other end of the housing 16, terminating into a wide angle cut away flared throat indicated at 20.

A pair of spaced ball seats 21 and 22 are formed in duplicates, each having inner and outer spherical seat portions and a transverse annular ledge 23 and a bottom pivoting spherical bearing surface 24. The inside working or spherical surface 25 of each ball seat member or unit 21 and 22 conforms to and cooperates with the ball surface 12 of the ball stud 10, whereas the outer working surface 26 of each such seat member is shaped to fit within and be movable with respect to the curved housing surface 18.

A combined spring retainer and bearing plate 30 has a cupped central portion 31 in which the pip or extension 13 of the ball extends. The rim of the plate 30 contacts the ledge 23 on the ball seats as shown. Interposed between the lower portion 24 of the ball seats and the under surface of the retainer 30 is a coil spring 35 assembled under load so that upon expansion all parts of the joint are automatically and continuously maintained in operative contact. One end of the cavity 17 of the housing 16 is closed by a retaining washer 38 held in position by the turned over edge 39 of the end of the housing 16. It is to be noted that the upper edges 28 of the ball seats 21 and 22 are spaced away from the neck 11 of the stud 10 terminating on the top portion of the ball surface 12 spaced from the uppermost top thereof. In other words, the throat at the rim or edges 28 at the top of the two seats, when assembled, forms an opening very much larger than the neck 11 of the stud 10 where it connects with the ball 12. As indicated above, a particular feature of the present invention is the configuration of the reduced portion 11 of the neck of the stud 10 in combination with not only the upper ends 28 of the ball seats 21 and 22, but also with the flared wide opening 20 on the housing 16, above described. Referring to Figure II, it will be seen that the exact configuration of the neck 11 is such as to permit the stud 10 to lie against the flare 20 of the housing 16 and that the upper edge 28 of the ball seats is cut away as stated supra, to permit the neck 11 to lie flush against the flare 20 of the housing 16 as shown.

In Figure II I have illustrated diagrammatically the angle of oscillation permitted by the arrangement shown. The 30 degree arc illustrated on each side of the vertical V illustrates the angle (which is relatively wide) permitted by the stud and housing due to the flared portion 20 and due to the fact that the upper portion or rim 28 of the ball seats is spaced and cut as shown. In view of the special shape and reduced portion 11 to the neck of the stud it will be seen that I increase the angle of oscillation 7.5 degrees on each side of the vertical by the relatively small amount of reduction in the neck of the stud illustrated. This gives an added total oscillation of 15 degrees or an over-all oscillation by my improved construction of 75 degrees.

In the modification illustrated in Figure III, it will be seen that the reduced neck portion 11 of the stud 10 is here illustrated in combination with the ball seats and housing in which a total of 60 degrees of oscillation is obtained, but in this embodiment the seats extend a further distance marked S around the ball while the housing also extends a greater distance marked H around the ball seats, thus providing in the embodiment of Figure III for the greater coverage and hence a greater factor of safety against the ball parts pulling apart from use.

Referring to Figure I, it is noted that the special configuration of the neck portion 11 shown in both Figures I and III is such that the bending moment between the connection of the ball stud with the steering knuckle arm 40 is not materially interfered with since it is believed that the compliance with the possible bending moment would not be adversely affected as long as the material was not cut away more than the lines X—X illustrated in Figure I and that the upper shoulder 11' forms a rugged construction against the shear and torsion when the stud is in the position of the widest angle of movement such as illustrated in Figure II.

It is apparent that, within the scope of the invention, modifications and different arrangements may be made other than is herein disclosed, and the present disclosure is illustrative merely, the invention comprehending all variations thereof.

What I claim is:

1. In a universal joint arranged to permit a wide angle of oscillation between the parts of said joint, a housing having a cavity with an inner spherically shaped portion and an open end with a widely flared edge extending substantially below the housing end adjacent to said spherical portion, said housing having its other end closed, the closure having a central bearing therein; a pair of substantially identical cooperating ball seats each having an outside spherical portion fitting within the spherical cavity of said housing and a central bearing portion at the other end of said seats, a transverse ledge formed integral with each of said seats, said ledge located between said spherical seating portion and said central bearing; a ball and ball stud having a ball portion seating within said seats and a stud extending outwardly through said flared open end of said housing, said stud having a reduced neck portion adjacent said ball to increase the angle of oscillation of said ball and stud relative to said housing; a central bearing on the other side of said ball opposite said reduced neck portion of said ball stud; a floating disc like spring retainer having a bearing surface adapted to support said bearing on said ball, the periphery of said disc located adjacent said ledges on said ball seats; and a loaded coil spring interposed between said floating retainer and the inside end of said ball seats, whereby said ball and ball seats and said ball seats and housing are constantly maintained in operative position.

2. In a universal joint arranged to permit a wide angle of oscillation between the parts of said joint, a housing having a cavity with an inner spherically shaped portion and an open end with a widely flared edge extending substantially below the housing end adjacent to said spherical portion, said housing having its other end closed, the closure having a central bearing therein; a pair of substantially identical cooperating ball seats each having an outside spherical portion fitting within the spherical cavity of said housing and a central bearing portion at the other end of said seats, a transverse ledge formed integral with each of said seats, said ledge located between said spherical seating portion and said central bearing; a half ball and ball stud having a ball portion seating within said seats and a stud extending outwardly through said flared open end of said housing, said stud having a reduced neck portion adjacent said ball and the edge of said seats terminating on the surface of said ball substantially below said neck to increase the angle of oscillation of said ball and stud relative to said housing; a spherically-shaped central extension integral with said half ball on the opposite side from said reduced neck portion to form a central bearing for said ball and ball stud; a floating disc like spring retainer having a bearing surface adapted to support said central bearing on said ball, the periphery of said disc located adjacent said ledges on said ball seats; and a loaded coil spring interposed between said floating retainer and the inside end of said ball seats, whereby said ball and ball seats and said ball seats and housing are constantly maintained in operative position.

3. In a universal joint arranged to permit a wide angle of oscillation between the parts of said joint, a housing having a cavity with an inner spherically-shaped portion and an open end with a widely flared edge extending substantially below the housing end adjacent to said spherical portion, said housing having its other end closed and a bearing therein; a pair of substantially identical cooperating ball seats each having an outside spherical portion fitting within the spherical cavity of said housing and a bearing portion at the other end of said seats, a transverse ledge formed integral with each of said seats, said ledge located between said spherical seating portion and said end bearing; a ball and ball stud having a ball portion seating within said seats and a stud extending outwardly through said flared open end of said housing, said stud having a reduced neck portion adjacent said ball to increase the angle of oscillation of said ball and stud relative to said housing, said stud having a central bearing surface at the other side of said ball opposite said reduced neck portion of said ball stud; a floating transverse spring retainer having a bearing surface adapted to contact said central bearing on said ball, the periphery of said retainer located adjacent said ledges on said ball seats; and a loaded spring interposed between said floating retainer and the inside end of said ball seats, whereby said ball and ball seats and said ball seats and housing are constantly maintained in operative position.

WILLIAM A. FLUMERFELT.

REFERENCES CITED

The following references are of record in the file of this patent:

UNITED STATES PATENTS

| Number | Name | Date |
|---|---|---|
| 1,910,926 | Lutz | May 23, 1933 |
| 2,048,803 | Marles | July 28, 1936 |
| 2,122,655 | Niles | July 5, 1938 |
| 2,205,981 | Klages | June 25, 1940 |
| 2,236,062 | Katcher | Mar. 25, 1941 |
| 2,281,097 | Flumerfelt | Apr. 28, 1942 |
| 2,304,732 | Flumerfelt | Dec. 8, 1942 |